US008331918B2

United States Patent
Steimer et al.

(10) Patent No.: US 8,331,918 B2
(45) Date of Patent: Dec. 11, 2012

(54) REDIRECTING OF CALLS TO AVOID NETWORK INTERWORKING BETWEEN FIXED NETWORK AND RADIO COMMUNICATIONS NETWORK

(75) Inventors: Franz Steimer, Nossendorf (DE); Jörg Schirrwitz, Berlin (DE)

(73) Assignee: Deutsche Telekom AG, Bonn (DE)

( * ) Notice: Subject to any disclaimer, the term of this patent is extended or adjusted under 35 U.S.C. 154(b) by 1125 days.

(21) Appl. No.: 10/593,428

(22) PCT Filed: Feb. 11, 2005

(86) PCT No.: PCT/DE2005/000238
§ 371 (c)(1),
(2), (4) Date: Oct. 18, 2007

(87) PCT Pub. No.: WO2005/091611
PCT Pub. Date: Sep. 29, 2005

(65) Prior Publication Data
US 2008/0167023 A1   Jul. 10, 2008

(30) Foreign Application Priority Data
Mar. 16, 2004   (DE) .................. 10 2004 013 855

(51) Int. Cl.
*H04M 3/42* (2006.01)
(52) U.S. Cl. ..... 455/417; 455/445; 455/461; 455/435.1; 455/573; 455/557
(58) Field of Classification Search ............ 455/417, 455/445, 461, 435.1, 573, 557
See application file for complete search history.

(56) References Cited

U.S. PATENT DOCUMENTS

| 6,615,034 | B1 * | 9/2003 | Alloune et al. ............... 455/406 |
| 6,950,674 | B2 * | 9/2005 | Jarrett ......................... 455/552.1 |
| 7,046,783 | B1 * | 5/2006 | Bosik et al. .............. 379/211.02 |
| 2001/0043570 | A1 * | 11/2001 | Gossman ...................... 370/259 |
| 2002/0026317 | A1 * | 2/2002 | Labrique et al. ............. 704/258 |
| 2002/0164979 | A1 | 11/2002 | Mooney et al. |
| 2003/0022660 | A1 * | 1/2003 | Payne et al. ................... 455/417 |
| 2003/0181202 | A1 * | 9/2003 | Link et al. .................... 455/417 |
| 2004/0247107 | A1 * | 12/2004 | Chen et al. .................... 379/219 |
| 2010/0240343 | A1 * | 9/2010 | Russell ......................... 455/411 |

FOREIGN PATENT DOCUMENTS

| DE | 41 40 974 A1 | 6/1993 |
| DE | 43 44 702 A1 | 7/1995 |
| DE | 44 20 462 A1 | 12/1995 |
| DE | 197 26 175 A1 | 12/1998 |
| DE | 197 41 775 A1 | 4/1999 |
| DE | 197 43 361 A1 | 4/1999 |

(Continued)

*Primary Examiner* — Barry Taylor
(74) *Attorney, Agent, or Firm* — Kenyon & Kenyon LLP

(57) ABSTRACT

A system and method concerning the field of call redirecting enables a second subscriber to keep incoming calls, which originate, e.g. from a fixed network connection of a first subscriber but are destined for a radio network connection of the second subscriber, in the fixed network so that they are redirected to a fixed network connection of the second subscriber. This method may result in eliminating network crossover costs that would accrue when using different communications networks for setting up calls. For utilizing the call redirecting function, the second subscriber shares in the saved network transition costs by receiving a bonus resulting from the saved network crossover costs. In order to simplify the utilization of the call redirecting function, a device is assigned to the second subscriber that, when activated, automatically initiates a control call for activating the switchover function.

18 Claims, 1 Drawing Sheet

FOREIGN PATENT DOCUMENTS

| | | |
|---|---|---|
| DE | 198 10 797 A1 | 9/1999 |
| DE | 198 56 269 A1 | 6/2000 |
| DE | 199 12 385 A1 | 9/2000 |
| DE | 199 15 548 A1 | 10/2000 |
| DE | 100 59 327 A1 | 6/2002 |
| DE | 102 15 318 A1 | 4/2003 |
| EP | 0 456 128 | 11/1991 |
| EP | 06 56 717 A1 | 6/1995 |
| EP | 07 00 227 A2 | 3/1996 |
| EP | 07 12 230 A2 | 5/1996 |
| EP | 0 738 093 | 10/1996 |
| EP | 0 740 480 | 10/1996 |
| EP | 08 41 798 A2 | 5/1998 |
| EP | 0 996 272 | 4/2000 |
| EP | 1 033 897 | 9/2000 |
| WO | WO 97/24004 A | 7/1997 |
| WO | WO 98/09425 A1 | 3/1998 |

\* cited by examiner

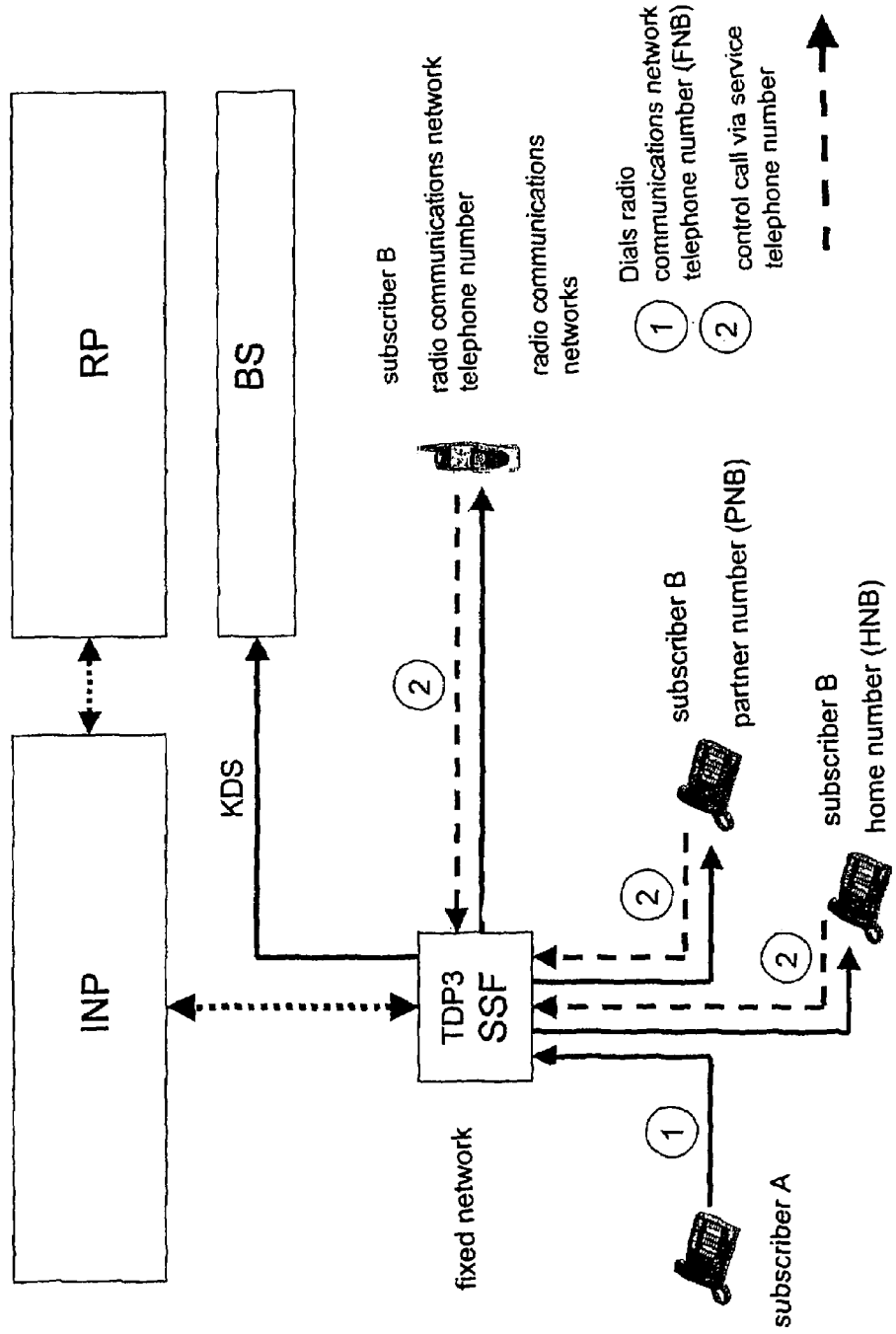

REDIRECTING OF CALLS TO AVOID NETWORK INTERWORKING BETWEEN FIXED NETWORK AND RADIO COMMUNICATIONS NETWORK

FIELD OF THE INVENTION

The present invention relates to a method and a device for cost-effective redirecting of calls. In particular, it relates to the field of call redirecting/call forwarding of incoming calls within differently structured communication networks, as is the case between fixed networks and radio communications networks having mobile radio communications terminals.

BACKGROUND INFORMATION

A multitude of solutions is available for call forwarding. German patent reference DE 100 59 327, for example, appears to describe a device and a method for forwarding messages to terminals of different communications media, in order to achieve the ability to reach a subscriber in a switch between a plurality of terminals, including both fixed and mobile terminals. Among the mobile terminals are mobile telephones as well. The reference involves a telecommunications device having a database, which includes subscriber-specific information about the number of target subscribers and terminals assigned thereto, and message formats compatible with these terminals. The control of the processes is implemented via a corresponding control device. Upon receipt of a message for a target subscriber, the control device utilizes the subscriber-specific information to select one or a plurality of terminal(s) via which the target subscriber is able to be reached, converts the message with the aid of conversion modules, and forwards it to the selected terminals for transmission.

In this approach, calls from the fixed network as well as calls from the mobile radio communications network are forwarded to the terminals specified by the subscriber-specific information.

This approach focuses on the ability of reaching the subscriber during a switch between a plurality of terminals that may be of different type. Savings in connection with the fees of network interworking or costs resulting from the rate structures of the communication networks themselves, are not the subject of the solution.

German patent reference DE 199 15 548 A1 describes a method for combining fixed network and mobile communications network telephony. This solution appears based on at least one home location source, a fixed network, and a mobile telephony network. The subscriber has a dual-mode terminal, which operates both in radio network operation and in cordless mode. The subscriber can be reached and respond at one number, via a single terminal having automatic network selection.

In addition, German patent reference DE 198 10 797 appears to describe a network-crossing mobility management for multi-range terminals. To control the network-crossing reachability of a multi-range terminal having a mobile line and a fixed network line, the multi-range terminal transmits to the mobile radio communications network a mobile-network cancellation message when entering the service area of the fixed network, or a mobile-network inscription message when leaving it. In the home location register of the mobile radio communications network, this sets, or cancels, reachability information that indicates the reachability of the multi-range terminal on the fixed network. In a connection request, a query to the home location register takes place. Depending on the reachability information, the call is routed to the mobile radio network or to the fixed network line of the multi-range terminal.

In this approach, calls from the fixed network and calls from the mobile radio network are both forwarded as a function of reachability information. Here, too, the focus is not on network interworking fees or network rates.

German patent reference DE 102 15 318 A1 appears to describe a method and a device for coupling mobile radio communications technology and fixed network communications technology, a mobile radio terminal dialing an add-on device integrated in the fixed network via a mobile communications network and checking the access authorization of the caller. If the result of the access authorization is positive, line enabling and thus release of a fixed network line takes place. The desired subscriber telephone number is then input from the radio communications network, from the mobile radio communication device directly, or indirectly via an add-on device, and dialed by the add-on device.

This is designed for telephone calls from the mobile radio communications network to the fixed network and is meant to allow the utilization of advantageous mobile radio communications rates as well as fixed network rates.

German patent reference DE 198 56 269 A1 appears to describe a method for call forwarding of a call made from a first subscriber station to a second subscriber station in the public network. The telephone number of the first subscriber station, or a corresponding identification, is transmitted to the second subscriber station where it is routed to a call forwarding memory. With the aid of a call service or data service, the telephone number or the corresponding identification and/or a callback message are/is forwarded to a call service subscriber or a call forwarding location assigned to the second subscriber station as a function of a target address stored in the call forwarding memory. After receipt of the telephone number identification, the call service subscriber may decide whether to return the call of the calling subscriber station.

Only the telephone number or the caller identification is forwarded in this approach. A connection that is subject to a fee is not established at this stage. No automatic additional fees for redirecting the call arise.

It is up to the called subscriber to decide whether he wants to provide the calling subscriber with a callback message or whether he will return the call of the calling subscriber.

All solutions have in common that they actually save money. However, they do not explicitly focus on saving network interworking fees within the sense of the approach according to the present invention.

SUMMARY OF THE INVENTION

Embodiments of the present invention involve saving network interworking fees that are charged when crossing over from one communication network to another communication network, or to reduce such costs to the greatest extent possible. The basic problem arising in this context is that the savings potential is largely a function of the subscriber since, initially, only the subscriber has knowledge of his location.

In addition to saving network interworking fees, as they occur in the crossover from a fixed network to a mobile communications network, for instance, a simultaneous solution is to be found that motivates the subscriber to forward information of his location, for example, so as to allow calls that arrive via the fixed network to remain on the fixed network, or to allow calls that arrive via a radio communications network to remain on the radio communications network.

In embodiments of the present invention, many subscribers are able to be reached on more than one network, and that many calls in which the subscriber dials a radio communications telephone network number via a fixed network line, are also quite easily conductable via the fixed network exclusively, provided the subscriber a) is located in the vicinity of a fixed network line assigned to him; and b) the redirecting of the radio communications network telephone number dialed on the fixed network to a fixed network number assigned to the subscriber is allowed.

The same also applies in the reverse to calls in which a subscriber dials a fixed network telephone number via a radio communications network telephone number. However, this variant is useful only if the cost structures on both networks are substantially similar.

In embodiments of the present invention, under certain conditions, a subscriber B may keep his incoming calls that originate from a fixed network line of a subscriber A, but are destined for a radio communications network line of subscriber B, on the fixed network; and to forward calls that arrive from radio communications network telephone numbers FNB and are destined for a fixed network terminal, to a radio communications network terminal of intended subscriber B, so that the call will remain within the radio communications network.

For additional motivation, subscriber B receives a share of the saved network interworking costs in the form of a bonus.

Since the solution is based on the same operating principle for both the radio communications network and the fixed network, only the case in which the call originates from a fixed network terminal will be elucidated in greater detail below.

Embodiments of the present invention may involve redirecting calls arriving from the fixed network and intended for a radio communications network telephone number FNB of subscriber B, to a fixed network line of subscriber B as a function of the location, in accordance with principles of call redirecting/call forwarding known per se. In every successful setup of a connection in which the communication is conducted exclusively via the fixed network, subscriber B receives a credit for redirecting the incoming call to the telephone number of his fixed network line. The credit is derived from the network interworking costs that were saved by the communication connection between subscriber A and subscriber B not being carried out via two differently structured communication networks, as intended by subscriber A, but exclusively via a single communication network. The credit is credited to subscriber B in the telephone bill for his fixed network line.

However, the call redirecting to a fixed network telephone number of subscriber B, for instance, is useful only if subscriber B is actually staying in the vicinity of the corresponding fixed network line. In most cases, this will be a home telephone line of subscriber B. The telephone number of subscriber B's home line will be denoted by home number HNB in the following text. The efficiency of the approach may be increased by incorporating at least one second fixed network telephone number of subscriber B into the method, which will be denoted by partner number PNB in the following text. Partner number PNB is provided to redirect an incoming call to an alternative location of subscriber B. This may be, for example, a fixed network terminal at the workplace of subscriber B. The credit continues to accrue to home number HNB of subscriber B even if the particular call is redirected to partner number PNB.

Embodiments of the present invention may be realized via a service platform of a provider which has implemented a corresponding service feature or a corresponding service on its service platform INP.

On service platform INP, all radio communications network telephone numbers FNB and fixed network telephone numbers of respective subscriber B that are eligible for the service are recorded in a service-specific database and provided with a corresponding assignment.

Every radio communications network telephone number FNB and every fixed network telephone number must be used no more than once. This means that a fixed network telephone number that is used as home number HNB is eliminated as partner number PNB.

There is a 1:1 relation between radio communications network telephone number FNB and the fixed network telephone number with respect to radio communications network telephone number FNB and home number HNB, and with respect to radio communications network telephone number FNB and partner number PNB.

With the aid of this relation, it is always possible to use one of the three telephone numbers to determine the other two telephone numbers.

In a registration process subscriber B must provide the service provider with home number HNB, partner number PNB and radio communications network telephone number FNB. However, setting up a partner telephone number PNB may also be optional.

The service may be activated as a function of the particular terminal used, with the aid of a control call triggered by an already registered subscriber, either via a service telephone number assigned to the fixed network, or via a service telephone number assigned to the radio communications network. Using the service telephone number in combination with the source number from which the control call is placed, subscriber B determines radio communications network telephone number FNB, home number HNB and partner number PNB to which calls originating from the fixed network and intended for a radio communications network telephone number FNB of subscriber B are to be routed. From the fixed network, service platform INP is supplied with information about all calls to radio communications network telephone numbers. Service platform INP ensures that, until notified otherwise, all further calls that originate from the fixed network and are destined for a radio communications network telephone number FNB of subscriber B remain in the fixed network and are redirected to the fixed network line (home number HNB or partner number PNB), or are routed to the radio communications network telephone line as set up by the most recent control call.

To facilitate the switchover for the subscriber, a switchover device, which is configured in the form of a cradle having a storage depression, may be situated at the location of the home and/or partner line. The cradle accommodates a radio communications terminal such as a mobile telephone. There is a switch element in the storage depression, which is triggered when the mobile telephone is placed in the storage depression. The actuation of the switch element activates a call to a service telephone number, which effects the redirection of the radio communication network calls arriving from the fixed network, to the terminal of the fixed network line in whose vicinity the switchover device is located. If the mobile telephone is removed again from the storage depression of the switchover device, renewed actuation of the switch element activates a control call to a second service number, and the switchover function is revoked again.

Another embodiment involves equipping the designated fixed network terminal with a detector, which detects the presence of the radio communications network telephone terminal.

In a further embodiment, if the detector detects the presence of the radio communications network terminal, automatic call redirecting to the individual fixed network terminal to which the detector is assigned is implemented according to the principle already elucidated in connection with the switchover device. The call redirecting will be cancelled again when the detector no longer detects the presence of the radio communications network terminal.

BRIEF DESCRIPTION OF THE DRAWING

FIG. 1 shows an exemplary embodiment for a service implemented on a service platform INP.

DETAILED DESCRIPTION

FIG. 1 shows an exemplary embodiment for the implementation of the design approach on a service platform of a service provider in intelligent network INP.

Service platform INP illustrated in FIG. 1 shows both the subscribers registered for the service with their respective telephone numbers such as radio communications network telephone number FNB, home number HNB and partner number PNB, and, to the extent that a restriction of the service to source and target lines within a specific network is required, the affiliation of telephone numbers with certain networks.

The following table 1 illustrates in which way the customers participating in the service are mapped on service platform INP. No double entries are permitted in the fields of radio communications network telephone number FNB, home number HNB and partner number PNB. A number that is used as home number HNB cannot simultaneously be used as partner number, and vice versa.

TABLE 1

| | |
|---|---|
| Radio communications network telephone number FNB | radio communications network telephone number to be redirected to the fixed network, if appropriate |
| status | Indicates how the customer wants to be reached:<br>@mobile - at his radio communications network telephone number FNB<br>@home - at his home number HNB in the fixed network<br>@partner - at his partner number FNB in the fixed network |
| home number HNB | fixed network telephone number for which credits are granted.<br>First alternative destination to radio communications network telephone number FNB in the fixed network |
| partner number PNB | Second alternative destination to radio communications network telephone number FNB in the fixed network |
| expiration@home | expiration date of home number HNB if service is not utilized |
| expiration@partner | expiration date of partner number PNB if service is not utilized |
| expiration@mobile | expiration date of radio communications network telephone number FNB if service is not utilized |

In a further embodiment, the service is controlled via service telephone numbers. Depending on their reachability from the fixed network or from a radio communications network, telephone numbers that are subject to different rates may be used.

A customer who is interested in participating in the service is registered for the service on service platform INP of the service provider in a one-time operation.

This registration process involves obtaining a clear assignment between a radio communications network telephone number FNB and a fixed network telephone number, denoted by home number HNB, of a subscriber B, which are jointly stored on service platform INP after successful completion of the process.

The registration of an additional partner number PNB is available and may be optional.

It should be noted in this context that neither the radio communications network telephone numbers FNB nor the fixed network telephone numbers (HNB or PNB) may appear in an already existing assignment and that the participating fixed network telephone numbers must be switched at a fixed network provider participating in the service. In this exemplary embodiment, registrations can be made only from the fixed network home line. The number of the first fixed network line of subscriber B is home number HNB to be registered. This telephone number must not belong to a pay telephone.

In the following text, the registration procedure on service platform INP will be elucidated in greater detail using the example of a fixed network telephone number and a 0800 service telephone number.

To initiate the registration process, subscriber B dials an administration number 0800-Admin. The call is routed to service platform INP. This is implemented in accordance with the general IN architecture, by triggering a trigger point with respect to dialed service telephone number 0800.

Service platform INP routes the call to registration platform RP.

In a user dialogue with MFV input, a subscriber B who is interested in participating in the service must provide for his registration a radio communications network telephone number FNB that is to be linked to the fixed network telephone number of subscriber B (home number HNB). To check the allowed assignment between home number HNB, automatically detected by service platform INP, and radio communications network telephone number FNB entered by subscriber B and announced for confirmation purposes, registration platform RP transmits a PIN to the radio communications network telephone having radio communication telephone number FNB, the transmission taking the form of an SMS. Within a specified waiting period, subscriber B must place another call from his fixed network line having assigned home number HNB to administration number 0800-Admin. The call is once again routed to registration platform RP via service platform INP. In a second user dialogue, subscriber B must enter the PIN received on his mobile radio communications network telephone. If the PIN is correct, the two telephone numbers, made up of fixed network number HNB and radio communications network telephone number FNB, may be entered as valid on service platform INP.

If no callback from the same fixed network line takes place within a specified waiting time, the pending registration process is erased. A later call using PIN input has no effect.

If the callback takes place in a timely manner but an incorrect PIN is entered repeatedly, the registration process begins anew.

After entering the valid PIN, the subscriber is offered the additional registration of a second fixed network telephone number, partner telephone number PNB. If the subscriber accepts the offer, this will be detected via an MFV dialogue and announced to the customer after completion of the input. Following confirmation by the customer, partner telephone number PNB is then likewise recorded in the particular database of service platform INP.

The status of the customer entry following registration is @Mobile. As a result, no call redirecting to the registered home or partner number takes place initially.

In addition to the registration, telephone number 0800-Admin is also used to delete registrations. Which specific business event is involved is revealed by the examination as to whether the number of calling subscriber B is already registered on service platform INP as home number HNB. Accordingly, a user dialogue for one or the other business event is started on registration platform RP.

If, within the framework of the registration, the source telephone number (home number HNB) or entered partner number PNB are telephone numbers from a fixed network that is not intended for the service, from a line (such as a pay telephone) not intended for the service, or from a radio communications network, an announcement takes place that the service may basically be used only from the telephone numbers of the fixed networks that are integrated in the service. In order to be able to evaluate all cases, accessing of the port data of the fixed network lines and the signaling on the network is required.

An embodiment may include an integrated loudspeaker, which outputs an announcement acknowledging the respective switchover.

In embodiments of the present invention, the service is activated by subscriber B himself, via a service telephone number. In the process, by means of a control call via a service telephone number, subscriber B initiates the redirecting of calls that arrive from the fixed network and are destined for his registered radio communications network telephone number FNB, to a fixed network telephone number (home number HNB or partner number PNB) also registered to him, in whose vicinity he is currently located.

The switchover function to a fixed network terminal may be triggered from the particular network on which subscriber B is currently located.

Two variants are possible in this context:
a) from the fixed network, irrespective of whether reachability on the fixed network or on the mobile radio communications network is desired.
b) from the mobile radio communications network, irrespective of whether reachability on the fixed network or on the mobile radio communications network is desired.

Service telephone numbers, which, depending on their reachability from the fixed network or radio communications network, may fall into different rate categories, may likewise be used to activate the switchover function, and thus to activate the service.

A description of the sequence for activating the redirection of calls arriving from the fixed network to a fixed network telephone number of subscriber B will follow.

Using the fixed network or a radio communications network, subscriber B calls up the assigned service telephone number. A call treatment is requested on service platform INP. Service platform INP determines source telephone number CgPNo of the calling subscriber within the framework of signaling. If source number CgPNo is able to be identified as radio communications network telephone number FNB, home number HNB or partner number PNB registered for the service, the corresponding status is set on service platform INP. All further calls to the assigned radio communications network telephone number FNB are then handled according to the status. In the event that a status change was able to be implemented successfully, the call will be terminated by a network announcement "The service feature is activated". If no change in the reachability status could be implemented, for example if source number CgPNo could not be identified on service platform INP, the connection will be terminated by a network announcement "Service or service feature not possible".

The present invention is explained in greater detail with the aid of an exemplary embodiment.

Using FIG. 1, the screening of the wire-wireless communication with optional redirecting to the fixed network following completed registration and service call to activate the call redirecting to the current fixed network terminal of subscriber B is described in greater detail.

The functional process sequence is as follows:
1. A fixed network customer, subscriber A, dials radio communications network telephone number FNB of a subscriber B.
2. Service switching function SSF triggers service platform INP via trigger detection point 3 (TDP3).
3a. If the service is not activated, the incoming call will be forwarded to designated radio communications network telephone number FNB (status: @mobile).
3b. If the service is activated, the incoming call will be redirected to the designated fixed network line, home number HNB (status: @home), or partner number PNB (status: @partner).

The call delivery to a fixed network line is permitted only if the call
a) is made from a fixed network provided for this service; and
c) source number CgPNo and redirection number RdgNo are not identical with the redirecting destination.

In all other cases the incoming call will not be incorporated in the service and forwarded to the designated radio communications network.

In embodiments, taking CgPNo and RdgNO into account in the service platform in connection with the stored redirecting destinations is unavoidable in order to prevent so-called circular routing.

By signaling a destination in the fixed network, the entry expiration@home or @partner (see table 1) is set ahead, for example, by two months after the current time. Signaling a destination in a radio communications network causes the entry expiration@mobile to be set ahead by, for instance, two months as well. If the current time reaches a set expiration date, complete erasure of a registration (at expiration@home, expiration@mobile), or only erasure of the optional entry of partner number PNB (expiration@partner), takes place in the registration. This method ensures that fixed network and mobile communications network numbers that are no longer reachable will be removed from the database of service platform INP.

If redirecting to the fixed network takes place, service platform INP initiates both monitoring of the call up to the end and also preparation of a communication data record KDS to determine the credit.

The call monitoring is advantageously implemented in the service switching function by which the triggering of service platform INP had been carried out.

Like other communication data records, communication data records KDS are collected from service switching function SSF and routed to billing service BS for processing. Communication data records KDS are relevant for any established communication connection, i.e., all connections redirected to the fixed network utilizing the service for which a credit is to be provided. Communication data records KDS includes the following data, among others:

| | |
|---|---|
| dialed telephone number | (radio communications network telephone number FNB of subscriber B) |
| fixed network telephone number subscriber A | (source of the call) |
| fixed network telephone number subscriber B | (HNB or PNB as destination) |
| fixed network telephone number HNB | (credit allocation) |
| starting time of the connection | (date/chronological time) |
| connection duration | (time) |

All customer data records KDS for a fixed network customer that fall into a billing period are added up, recorded in a credit entry and taken into account in the telephone bill of the home line. This is advantageously done in such a way that the call minutes documented in communication data records KDS are assigned a negative price.

To facilitate the activation and deactivation of the switchover function, a device that allows an automatic activation of the service is provided at the location of the home and/or the partner number (HNB/PNB). The device is designed as switchover device in the form of a cradle for a mobile radio communications terminal in which the mobile radio communications terminal of subscriber B, such as a mobile telephone, may be set down. This device is connected to the associated network termination device (TAE or NTBA, for instance) as additional fixed network terminal. By placing the mobile radio communications network terminal (mobile telephone) in the storage depression of the cradle, a switch element in this location is actuated, which activates or deactivates the service via a programmed service telephone number for status changes. The switch element may be configured as mechanical contact, for example. Two variants are provided for the device, one embodiment being configured for the interface connection to analog lines. The other embodiment is provided for ISDN lines and therefore programmable with respect to the MSN (multiple subscriber number).

When the mobile telephone is picked up, the associated control call is triggered with a delay. The delay is meant to ensure that the status@mobile is activated immediately upon pick-up of the mobile telephone and corresponding activation of the contact following a call from a fixed network (such calls are not redirected to the fixed network).

An additional, manually actuable second switch element, which is located on the switchover device as well, triggers the direct and non-delayed calling of the programmed service telephone number, and thus the control call. This specific embodiment is meant to allow an immediate switchover to mobile reachability instead of a delay when leaving the fixed network line. Display elements, which are disposed on the switchover device so as to be easy to see and preferably present in the form of light-emitting diodes, indicate the possible switching states of the device. The customer is then able to identify his current reachability, either on the fixed network line or the radio communications network line.

Because of the reference to source number CgPNo, which is detected by service platform INP and utilized to determine the desired reachability status, the switchover device may be used both in the vicinity of home number HNB and/or partner number PNB.

As an alternative, the device may also be equipped with a loudspeaker in order to ensure the acoustic reproduction of the announcements integrated in the network.

Furthermore, the device may also be configured as wireless embodiment in DECT/GAP standard for operation on analog and ISDN lines.

What is claimed is:

1. A method for cost-effective redirecting of calls in which, utilizing a service for the call redirection, calls destined for a first terminal of a subscriber are redirected to a second, alternative terminal of the subscriber according to the principle of call redirection, comprising:
following activation of a corresponding call redirection function via a service telephone number, redirecting a call that originates from a terminal of a first subscriber and is destined for a first terminal of a second subscriber, to a second, alternative terminal of the subscriber whenever it is detected that a network-crossing connection setup between the terminal of the first subscriber and the first terminal of the second subscriber is required to establish the desired connection of the first subscriber, the call redirection function allowing a call redirection only to a second terminal of the second subscriber that can be assigned to the same communications network as the terminal of the first subscriber from which the call originates, so that, in a successful setup of the connection, the communication between the first subscriber and the second subscriber is conducted exclusively via one communications network, and, in every successful setup of a call, the communication data records generated in connection with the call are recorded and analyzed in the processing system of the billing services to determine the saved network interworking costs, the second subscriber being allocated a freely specifiable portion of the determined saved network interworking costs.

2. The method of claim 1, wherein, if the redirection function is activated, a call that originates from a fixed network terminal of the first subscriber and is destined for a radio communications network telephone number of the second subscriber, is redirected to a fixed network telephone number of the second subscriber, so that, in a successful setup of the connection, the communication between the first subscriber and the second subscriber is conducted exclusively via the fixed network.

3. The method of claim 1, wherein, if the redirection function is activated, a call that originates from a radio communications network terminal of the first subscriber and is destined for a fixed network telephone number of the second subscriber, is redirected to a radio communications network telephone number of the second subscriber, so that, in a successful setup of the connection, the communication between the first subscriber and the second subscriber is conducted exclusively via the radio communications network.

4. The method of claim 1, further comprising:
implementing the registration for the service via a user dialogue with the dialogue system of the service platform using a service telephone number, the second subscriber providing the dialogue system with at least one of his radio communications network telephone numbers and at least one of his fixed network telephone numbers, and the two telephone numbers are interlinked following a PIN-based authorization check of the second subscriber and entered as valid on a service platform assigned to the service, the fixed network telephone number being entered as home number.

5. The method of claim 1, further comprising:
- after detecting a valid PIN, offering the second subscriber the registration of at least one second fixed network telephone number, which is configured as alternative partner number to the home number; and,
- after acceptance of the offer, linking the partner number with the already stored radio communications network number and the home number and is stored on the service platform assigned to the service.

6. The method of claim 1, wherein service telephone numbers are used to activate the service, and the source telephone number of the calling second subscriber is determined after a service telephone number has been dialed by the second subscriber, and, following identification of the source telephone number as radio communications network telephone number, home number or partner number registered for the service, a status, assigned to the respective service telephone number, for the call redirection is set on the service platform, and all further calls from the fixed network that are destined for the assigned radio communications network telephone number, are redirected to the home number or partner number defined by the status, until the current status changes.

7. The method of claim 1, further comprising:
- if the service is activated, after dialing a radio communications network telephone number of the second subscriber, redirecting the call originating from a fixed network terminal of a first subscriber to the fixed network terminal, defined by the current status, of the second subscriber,
- wherein redirecting takes place only if the call is coming from a fixed network provided for this service and if the source number and the redirection number are not identical with the redirection target; and, if the service is not activated, the incoming call is redirected to the radio communications network telephone number of the second subscriber dialed by the first subscriber.

8. The method of claim 1, wherein the freely specifiable portion of the saved network interworking costs is a credit to a telephone bill of the second subscriber.

9. A device for cost-effective redirecting of calls, comprising:
- a cradle for a mobile radio communications network terminal having integrated switchover function, which is located at the location of the home and/or the partner number,
- wherein the cradle has in its storage depression a first switch element, which is activated both by setting down and by removing the mobile radio communications network terminal, assigned to the cradle, of second subscriber, and a previously stored service telephone number is activated and triggered when the mobile radio communications network terminal is hung up, which in turn activates a service that redirects all calls destined for the mobile radio communications network terminal to the fixed network terminal that is registered as home or partner number and to which the cradle is assigned; and, after removal of the mobile radio communications network terminal from the storage device and the attendant renewed actuation of the switch element, the switchover function is canceled again via the service telephone number triggered thereby,
- wherein the first switch element is configured as mechanically actuated time switch contact which triggers the switchover function with a time delay following actuation by removal of a mobile radio communications network terminal from the cradle.

10. The device of claim 9, further comprising an additional, second switch element, which, after manual actuation by the second subscriber, triggers a direct and non-delayed calling of the programmed service telephone number for deactivation of the call redirecting, so that an immediate, mobile reachability of the mobile radio communications network terminal of the second subscriber is given.

11. The device of claim 9, wherein the cradle has the form of the charge cradle of a mobile radio communications network terminal.

12. The device of claim 9, wherein, in addition to the integrated switchover function, the cradle simultaneously has a charging function for a mobile radio communications network terminal.

13. The device of claim 9, wherein display elements, which indicate the current reachability of the second subscriber, on one of the utilized fixed network line and the radio communications network line, are disposed in a visible area of the device.

14. The device of claim 9, further comprising an integrated loudspeaker, which outputs an announcement acknowledging the respective switchover.

15. The device of claim 9, wherein the device is configured as wireless terminal according to the DECT/GAP standard.

16. The device of claim 9, wherein the device is connected to an analog network termination device or to a digital network termination device of the fixed network terminal registered as home number or partner number, according to an assignment of a respective fixed network terminal.

17. The device of claim 9, wherein display elements are light-emitting diodes.

18. A device for cost-effective redirecting of calls, comprising:
- a detector having a switch function assigned to a designated fixed network terminal of a second subscriber and able to detect a mobile radio communications network terminal, adapted thereto, of the second subscriber within a range of up to 30 meters, and, upon detecting the designated mobile radio communications network terminal of the second subscriber, the switch function linked to the detector is triggered automatically, the switch function accordingly activating a previously stored service telephone number, which triggers the redirecting of a call that is destined for the mobile radio communications network terminal and originates from a fixed network terminal of the first subscriber, to the fixed network terminal of the second subscriber to which the detector is assigned; and the removal of the mobile radio communications network terminal of the second subscriber from the action range of the detector triggers renewed activation of the service telephone number, which revokes the redirection again, so that all calls destined for the mobile radio communications network terminal of the second subscriber are once again forwarded to the designated mobile radio communications network terminal.

* * * * *